United States Patent
Kim et al.

(10) Patent No.: US 9,848,411 B2
(45) Date of Patent: Dec. 19, 2017

(54) METHOD FOR TRANSMITTING UPLINK CONTROL CHANNEL BY TERMINAL IN WIRELESS COMMUNICATION SYSTEM

(71) Applicant: LG ELECTRONICS INC., Seoul (KR)

(72) Inventors: Dongcheol Kim, Anyang-si (KR); Jiwoong Jang, Anyang-si (KR); Hangyu Cho, Anyang-si (KR); Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 14/358,686

(22) PCT Filed: Nov. 19, 2012

(86) PCT No.: PCT/KR2012/009786
§ 371 (c)(1),
(2) Date: May 15, 2014

(87) PCT Pub. No.: WO2013/073916
PCT Pub. Date: May 23, 2013

(65) Prior Publication Data
US 2014/0321337 A1   Oct. 30, 2014

Related U.S. Application Data

(60) Provisional application No. 61/561,236, filed on Nov. 17, 2011.

(51) Int. Cl.
*H04W 72/04* (2009.01)
*H04B 7/26* (2006.01)
(Continued)

(52) U.S. Cl.
CPC ...... *H04W 72/0413* (2013.01); *H04B 7/2656* (2013.01); *H04L 5/001* (2013.01);
(Continued)

(58) Field of Classification Search
None
See application file for complete search history.

(56) References Cited

U.S. PATENT DOCUMENTS

2011/0134774 A1* 6/2011 Pelletier ............ H04W 52/365
  370/252
2011/0164489 A1   7/2011 Papasakellariou et al.
(Continued)

FOREIGN PATENT DOCUMENTS

CN   101179326   5/2008
CN   101627564   1/2010
(Continued)

OTHER PUBLICATIONS

PCT International Application No. PCT/KR2012/009786, Written Opinion of The International Searching Authority dated Mar. 26, 2013, 15 pages.
(Continued)

*Primary Examiner* — Charles C Jiang
*Assistant Examiner* — George Atkins, Jr.
(74) *Attorney, Agent, or Firm* — Lee Hong Degerman Kang Waimey

(57) ABSTRACT

A method for transmitting an uplink control channel by a terminal in a wireless communication system that supports a plurality of serving cells for the terminal, comprises a step of receiving information on a plurality of serving cells include a P-cell and at least one S-cell constructed for the terminal and timing division duplex (TDD) downlink/uplink setup information for each of the plurality of serving cells, and a step of, in case of transmitting the plink control
(Continued)

(a)

(b)

channel via a specific subframe interval, transmitting the uplink control channel through a first S-cell allocated as an uplink subframe with respect to the specific subframe interval when it is determined, based on the TDD downlink/uplink setup information, that the specific subframe interval is allocated as a downlink subframe with respect to the P-cell.

9 Claims, 8 Drawing Sheets

(51) Int. Cl.
| | | |
|---|---|---|
| *H04L 5/00* | (2006.01) | |
| *H04W 52/32* | (2009.01) | |
| *H04W 52/14* | (2009.01) | |
| *H04W 52/40* | (2009.01) | |

(52) U.S. Cl.
CPC ......... *H04L 5/0053* (2013.01); *H04W 52/325* (2013.01); *H04W 72/0446* (2013.01); *H04W 52/146* (2013.01); *H04W 52/40* (2013.01)

(56) References Cited

U.S. PATENT DOCUMENTS

| | | | | |
|---|---|---|---|---|
| 2012/0281680 A1* | 11/2012 | Bostrom | ............... | H04L 5/0051 370/336 |
| 2013/0034018 A1* | 2/2013 | Wei | ................... | H04W 72/0453 370/254 |
| 2013/0083708 A1* | 4/2013 | Lin | ........................... | H04L 5/14 370/280 |
| 2013/0114472 A1* | 5/2013 | Tamaki | ................. | H04L 1/1854 370/280 |
| 2013/0155898 A1* | 6/2013 | Yin | ....................... | H04L 1/0026 370/254 |
| 2014/0016594 A1* | 1/2014 | Han | ........................ | H04L 5/001 370/329 |
| 2014/0233524 A1* | 8/2014 | Jang | .................. | H04W 74/0833 370/329 |

FOREIGN PATENT DOCUMENTS

| | | | | |
|---|---|---|---|---|
| KR | 10-2010-0118070 | 11/2010 | | |
| KR | 10-2011-0020668 | 3/2011 | | |
| KR | 10-2011-0083459 | 7/2011 | | |
| KR | 10-2011-0090778 | 8/2011 | | |
| WO | 2009/102182 | 8/2009 | | |
| WO | WO/2011/134338 | * 11/2011 | ............. | H04W 8/24 |

OTHER PUBLICATIONS

The State Intellectual Property Office of the People's Republic of China Application Serial No. 201280067393.7, Office Action dated Aug. 3, 2016, 10 pages.

* cited by examiner

FIG. 5
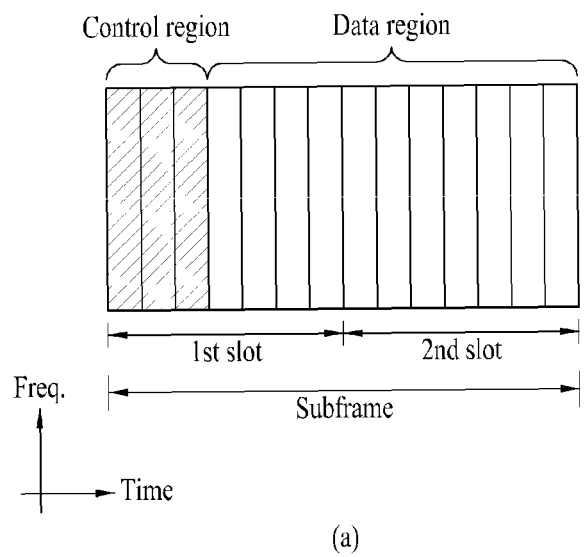
(a)
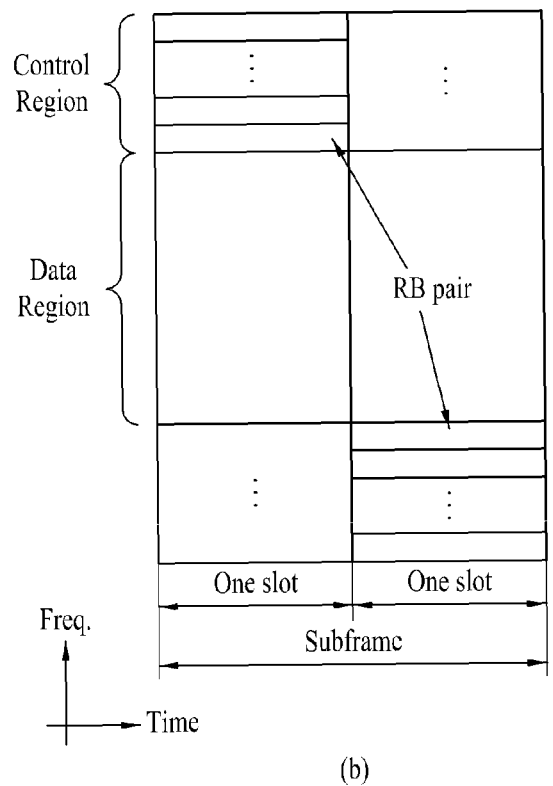
(b)

FIG. 7
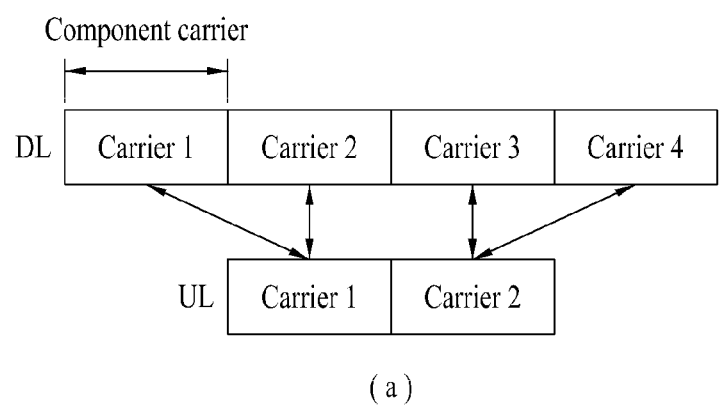
(a)
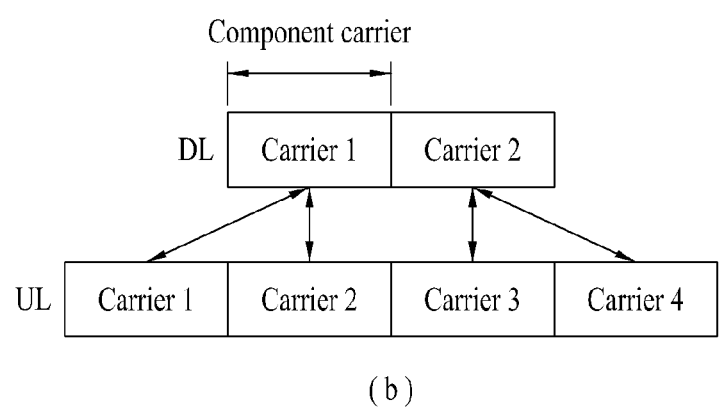
(b)

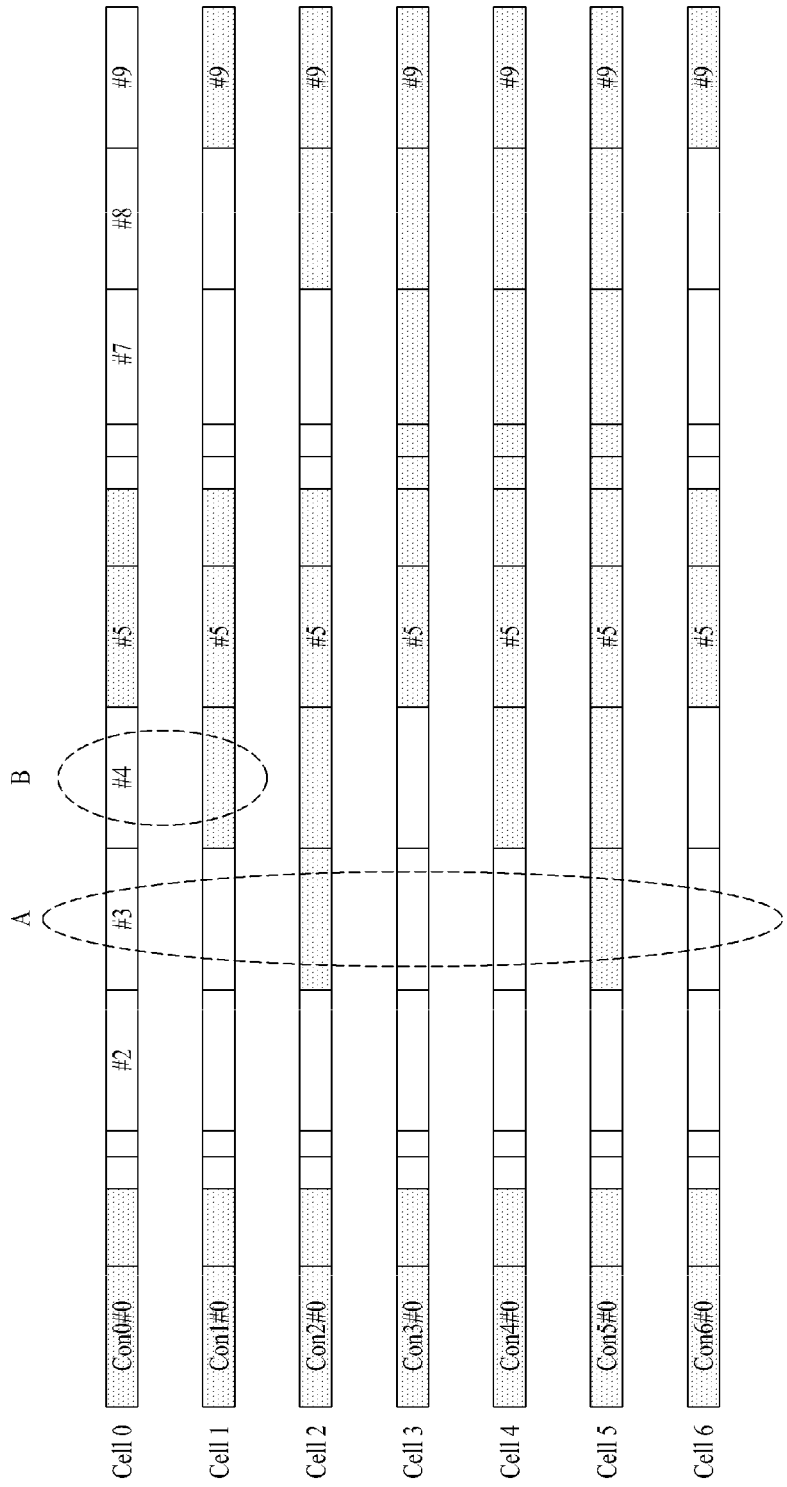

METHOD FOR TRANSMITTING UPLINK CONTROL CHANNEL BY TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2012/009786, filed on Nov. 19, 2012, which claims the benefit of U.S. Provisional Application No. 61/561,236, filed on Nov. 17, 2011, the contents of which are hereby incorporated by reference herein in their entirety.

TECHNICAL FIELD

The present invention relates to wireless communication system, and more particularly, to a method for transmitting an uplink control channel from a user equipment in a wireless communication system that supports a plurality of serving cells for the user equipment.

BACKGROUND ART

A 3rd generation partnership project long term evolution (3GPP LTE) (hereinafter, referred to as 'LTE') and LTE-advance (hereinafter, referred to as 'LTE-A') communication system which is an example of a wireless communication system to which the present invention can be applied will be described in brief.

FIG. 1 is a diagram illustrating a network structure of an Evolved Universal Mobile Telecommunications System (E-UMTS) which is an example of a mobile communication system.

The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), a base station (eNode B; eNB), and an Access Gateway (AG) which is located at an end of a network (E-UTRAN) and connected to an external network. Generally, the base station may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, the base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

Recently, standardization of the advanced technology of the LTE is in progress under the 3rd Generation Partnership Project (3GPP). In this specification, the advanced technology will be referred to as 'LTE-A'. One of the important differences between the LTE system and the LTE-A system is the difference in system bandwidth and introduction of a relay station.

The LTE-A system aims to support a broad bandwidth of maximum 100 MHz. To this end, the LTE-A system uses the carrier aggregation (CA) technology or the bandwidth aggregation technology, which achieves a broad bandwidth by using a plurality of frequency blocks.

The carrier aggregation (CA) uses a plurality of frequency blocks as one large logic frequency bandwidth to use a wider frequency bandwidth. A bandwidth of each frequency block may be defined on the basis of a bandwidth of a system block used in the LTE system. Each frequency block is transmitted using a component carrier.

As described above, although the CA is introduced and a plurality of component carriers are configured for the user equipment, a method for transmitting an uplink control channel if TDD (time division duplex) downlink/uplink configurations are configured differently among the plurality of component carriers has not been suggested specifically. The present invention is intended to suggest the method.

DISCLOSURE

Technical Problem

An object of the present invention devised to solve the conventional problem is to provide a method for transmitting an uplink control channel from a user equipment in a wireless communication system that supports a plurality of serving cells for the user equipment.

Another object of the present invention is to provide a user equipment for transmitting an uplink control channel in a wireless communication system that supports a plurality of serving cells for the user equipment.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages and in accordance with the purpose of the invention, a method for transmitting an uplink control channel from a user equipment in a wireless communication system that supports a plurality of serving cells for the user equipment comprises receiving information on a plurality of serving cells including a Pcell and at least one Scell configured for the user equipment, and timing division duplex (TDD) downlink/uplink configuration information for each of the plurality of serving cells; and transmitting an uplink control channel through a first Scell allocated as an uplink subframe with respect to a specific subframe interval, if it is determined that the specific subframe interval is allocated as a downlink subframe with respect to the Pcell based on the TDD downlink/uplink configuration information, in case of transmitting the uplink control channel for the specific subframe interval. The method may further comprise receiving information on at least one uplink power control parameter corresponding to the first Scell; and determining an uplink transmission power for transmitting the uplink control channel through the first Scell by using the received at least one uplink power control parameter. The first Scell is an Scell having the lowest cell index of SCells of the plurality of serving cells, an Scell having the greatest number of uplink subframes of the Scells, or a predetermined Scell in case of TDD downlink/uplink configuration configured for the user equipment. The first Scell may be a random Scell of Scells of the plurality of serving cells. The first Scell may belong to the same timing advance (TA) group as that of the Pcell or belong to a timing advance (TA) group different from that of the Pcell. The at least one uplink power control parameter information may include a cell index. The at least one uplink power control parameter information may be received through a higher layer signaling, and the uplink control channel is a physical uplink control channel (PUCCH).

In another aspect of the present invention, a user equipment for transmitting an uplink control channel in a wireless communication system that supports a plurality of serving cells for the user equipment comprises a receiver configured to receive information on a plurality of serving cells including a Pcell and at least one Scell configured for the user equipment, and timing division duplex (TDD) downlink/uplink configuration information for each of the plurality of serving cells; a processor configured to perform a control operation to transmit the uplink control channel through a first Scell allocated as an uplink subframe with respect to a specific subframe interval, if it is determined that the specific subframe interval is allocated as a downlink subframe with respect to the Pcell based on the TDD downlink/uplink configuration information, in case of transmitting the uplink control channel for the specific subframe interval; and a transmitter configured to transmit the uplink control channel through the first Scell.

The receiver is configured to further receive information on at least one uplink power control parameter corresponding to the first Scell, and the processor is configured to determine an uplink transmission power for transmitting the uplink control channel through the first Scell by using the received at least one uplink power control parameter. The first Scell is an Scell having the lowest cell index of SCells of the plurality of serving cells, an Scell having the greatest number of uplink subframes of the Scells, or a predetermined Scell in case of TDD downlink/uplink configuration configured for the user equipment. The first Scell may belong to the same timing advance (TA) group as that of the Pcell.

Advantageous Effects

In accordance with various embodiments of the present invention, if different TDD DL/UL configurations are used under a CA status, a transmission power of the user equipment may properly be configured when a PUCCH is transmitted from SCell.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram illustrating a structure of a downlink subframe of a 3GPP LTE/LTE-A system which is an example of a wireless communication system;

FIG. 7 is a diagram illustrating a carrier aggregation (CA) communication system; and FIG. 8 is a diagram illustrating an example of TDD DL/UL configurations different from one another for each cell.

BEST MODE FOR CARRYING OUT THE INVENTION

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on the assumption that the mobile communication system is the 3GPP LTE or LTE-A system, the following description may be applied to other mobile communication systems except for particular matters of the 3GPP LTE or LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a user equipment (UE) refers to a mobile or fixed type user equipment such as a mobile station (MS) and an advanced mobile station (AMS). Also, it is assumed that the base station refers to a random node of a network terminal, such as Node B, eNode B, and access point (AP), which performs communication with the user equipment.

In a wireless communication system, a user equipment may receive information from a base station through a downlink (DL), and may also transmit information to the base station through an uplink. Examples of information transmitted from and received by the user equipment include data and various kinds of control information. Various physical channels exist depending on types and usage of information transmitted from or received by the user equipment.

Figure 1:
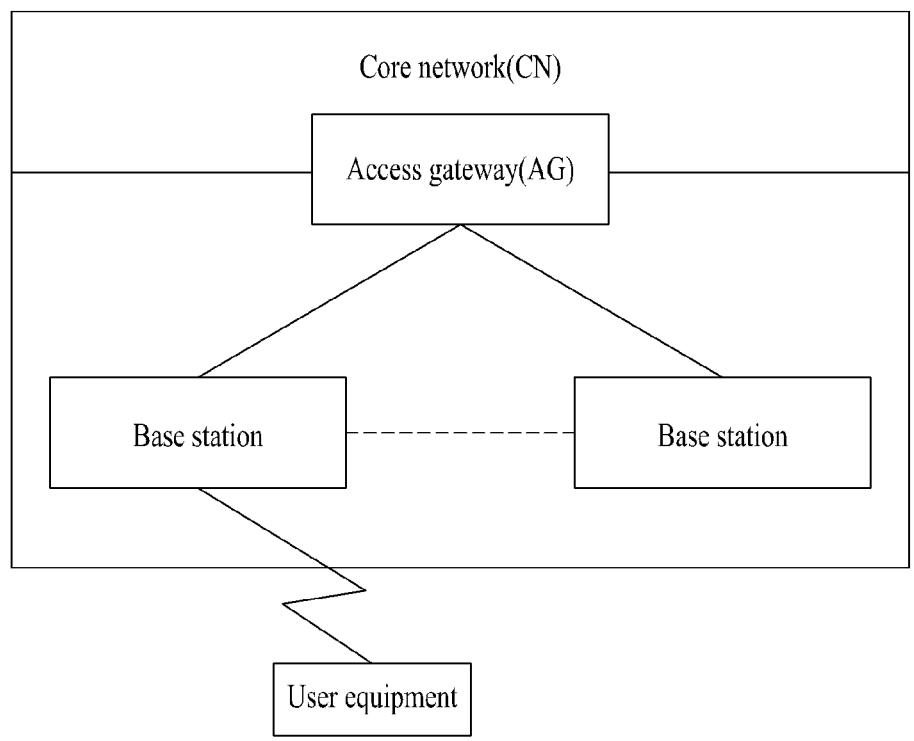
FIG. 1 is a diagram illustrating a network structure of an Evolved Universal Mobile Telecommunications System (E-UMTS), which is an example of a wireless communication system.
Figure 2:
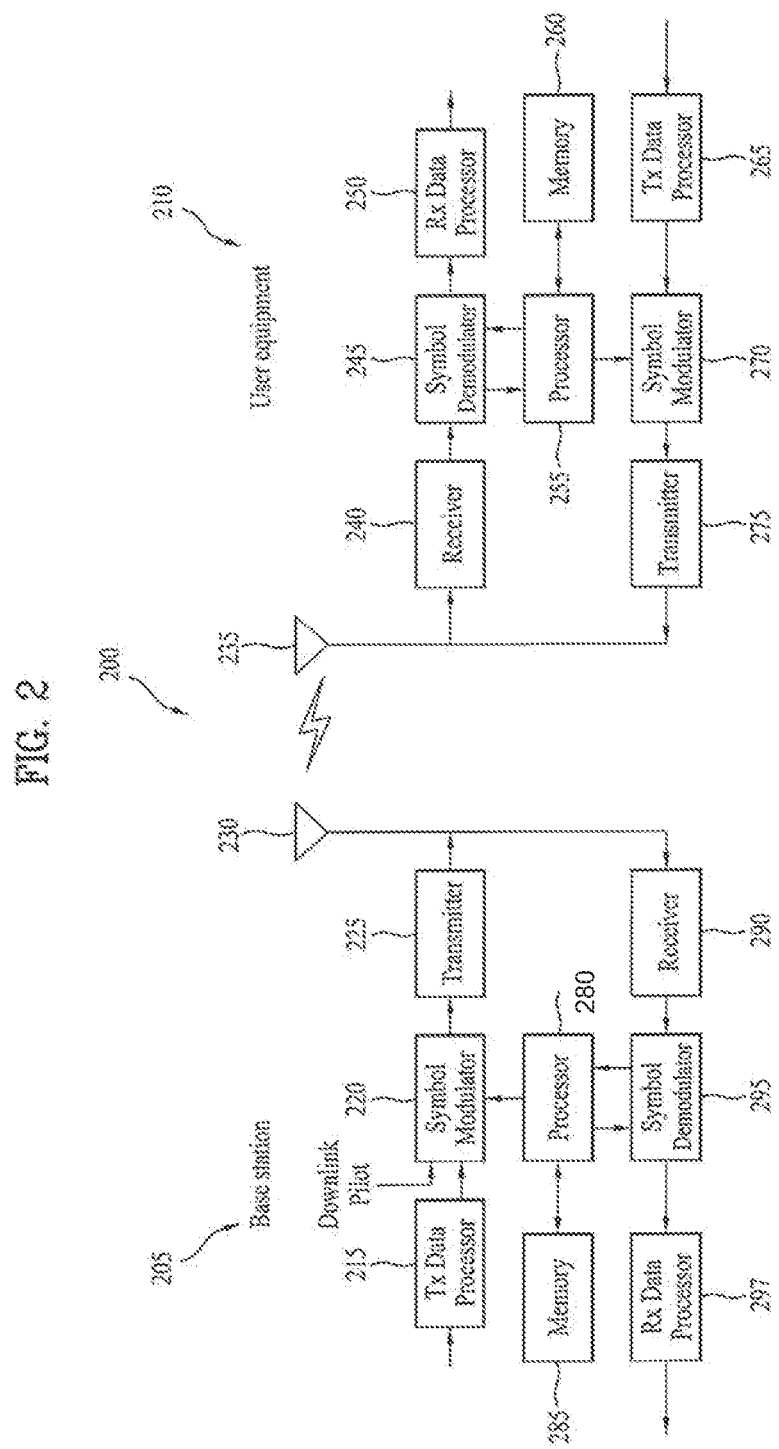
FIG. 2 is a block diagram illustrating configurations of a base station 205 and a mobile station 210 in a wireless communication system 200.

FIG. 2 is a block diagram illustrating configurations of a base station 205 and a user equipment 210 in a wireless communication system 200.

Although one base station 205 and one user equipment 210 are shown for simplification of a wireless communication system 200, the wireless communication system 200 may include one or more base stations and/or one or more mobile user equipments.

Referring to FIG. 2, the base station 205 may include a transmitting (Tx) data processor 215, a symbol modulator 220, a transmitter 225, a transmitting and receiving antenna 230, a processor 280, a memory 285, a receiver 290, a symbol demodulator 295, and a receiving (Rx) data processor 297. The user equipment 210 may include a Tx data processor 265, a symbol modulator 270, a transmitter 275, a transmitting and receiving antenna 235, a processor 255, a memory 260, a receiver 240, a symbol demodulator 245, and an Rx data processor 250. Although the antennas 230 and 235 are respectively shown in the base station 205 and the user equipment 210, each of the base station 205 and the user equipment 210 includes a plurality of antennas. Accordingly, the base station 205 and the user equipment 210 according to the present invention support a multiple input multiple output (MIMO) system. Also, the base station 205 according to the present invention may support both a single user-MIMO (SU-MIMO) system and a multi user-MIMO (MU-MIMO) system.

On a downlink, the Tx data processor 215 receives traffic data, formats and codes the received traffic data, interleaves and modulates (or symbol maps) the coded traffic data, and provides the modulated symbols ("data symbols"). The symbol modulator 220 receives and processes the data symbols and pilot symbols and provides streams of the symbols.

The symbol modulator 220 multiplexes the data and pilot symbols and transmits the multiplexed data and pilot symbols to the transmitter 225. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 receives the streams of the symbols and converts the received streams into one or more analog symbols. Also, the transmitter 225 generates downlink signals suitable for transmission through a radio channel by additionally controlling (for example, amplifying, filtering and frequency upconverting) the analog signals. Subsequently, the antenna 230 transmits the generated downlink signals to the user equipment 210.

In the configuration of the user equipment 210, the antenna 235 receives the downlink signals from the base station 205 and provides the received signals to the receiver 240. The receiver 240 controls (for example, filters, amplifies and frequency downcoverts) the received signals and digitalizes the controlled signals to acquire samples. The symbol demodulator 245 demodulates the received pilot symbols and provides the demodulated pilot symbols to the processor 255 to perform channel estimation.

Also, the symbol demodulator 245 receives a frequency response estimation value for the downlink from the processor 255, acquires data symbol estimation values (estimation values of the transmitted data symbols) by performing data demodulation for the received data symbols, and provides the data symbol estimation values to the Rx data processor 250. The Rx data processor 250 demodulates (i.e., symbol de-mapping), deinterleaves, and decodes the data symbol estimation values to recover the transmitted traffic data.

Processing based on the symbol demodulator 245 and the Rx data processor 250 is complementary to processing based on the symbol demodulator 220 and the Tx data processor 215 at the base station 205.

On an uplink, the Tx data processor 265 of the user equipment 210 processes traffic data and provides data symbols. The symbol modulator 270 receives the data symbols, multiplexes the received data symbols with the pilot symbols, performs modulation for the multiplexed symbols, and provides the streams of the symbols to the transmitter 275. The transmitter 275 receives and processes the streams of the symbols and generates uplink signals. The antenna 235 transmits the generated uplink signals to the base station 205.

The uplink signals are received by the base station 205 from the user equipment 210 through the antenna 230, and the receiver 290 processes the received uplink signals to acquire samples. Subsequently, the symbol demodulator 295 processes the samples and provides data symbol estimation values and the pilot symbols received for the uplink. The Rx data processor 297 recovers the traffic data transmitted from the user equipment 210 by processing the data symbol estimation values.

The processors 255 and 280 of the user equipment 210 and the base station 205 respectively command (for example, control, adjust, manage, etc.) the operation at the user equipment 210 and the base station 205. The processors 255 and 280 may respectively be connected with the memories 260 and 285 that store program codes and data. The memories 260 and 285 respectively connected to the processor 280 store operating system, application, and general files therein.

Each of the processors 255 and 280 may be referred to as a controller, a microcontroller, a microprocessor, and a microcomputer. Meanwhile, the processors 255 and 280 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 255 and 280.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 255 and 280, or may be stored in the memories 260 and 285 and driven by the processors 255 and 280.

In the present invention, in addition to a function of receiving or transmitting a signal between the user equipment 210 and the base station 205, the processor 255 of the user equipment and the processor 280 of the base station perform an operation for processing the other signal and data. However, for convenience of description, the processors 255 and 288 will not be mentioned specially. It is to be understood that the processors 255 and 288 perform a series of operations such as data processing not the function of receiving or transmitting a signal even though there is no mention of the processors 255 and 280.

Layers of a radio interface protocol between the user equipment 210 or the base station 205 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

Figure 3:
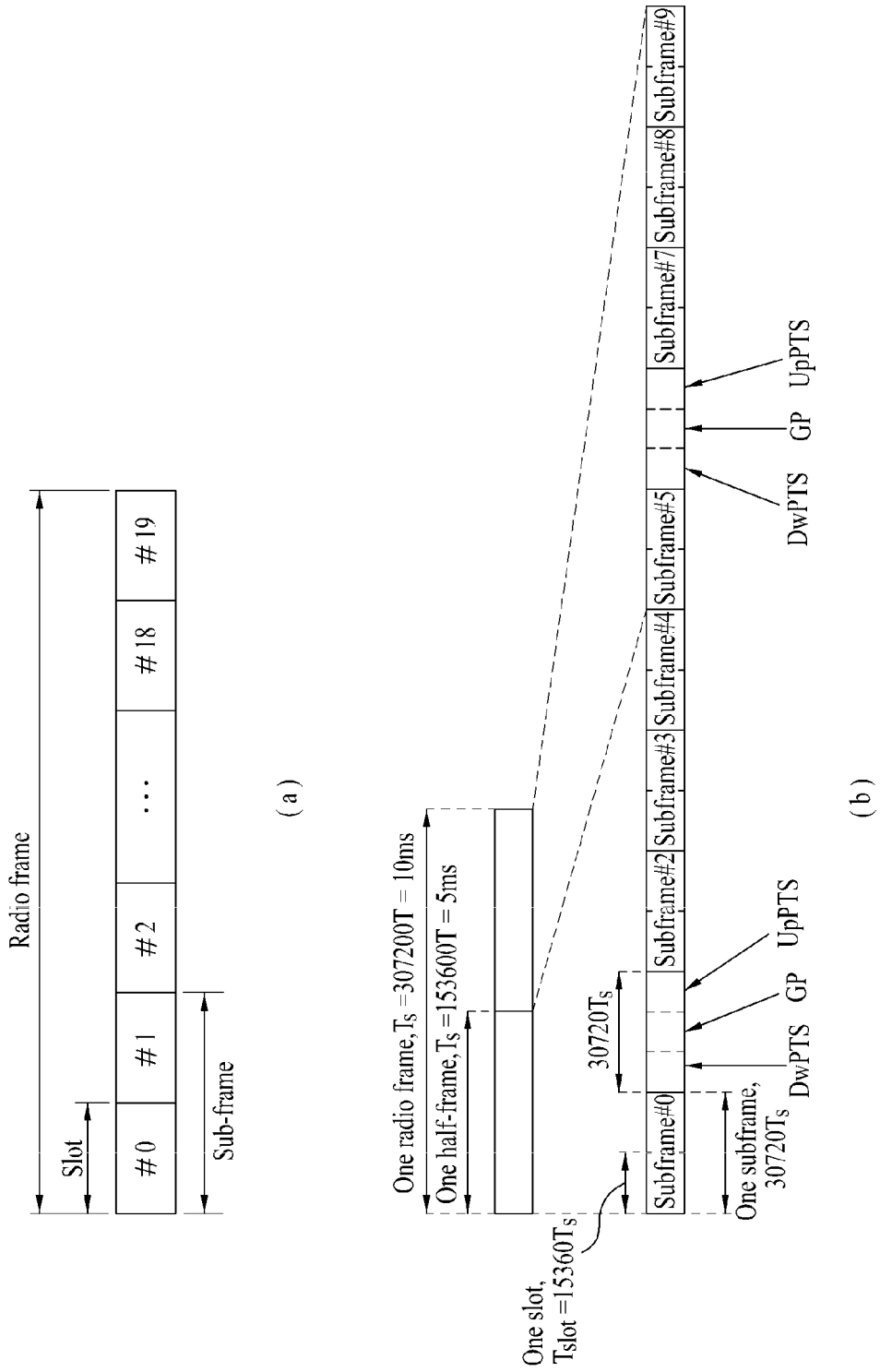
FIG. 3 is a diagram illustrating a structure of a radio frame used in a 3GPP LTE/LTE-A system which is an example of a wireless communication system.

FIG. 3 is a diagram illustrating a structure of a radio frame in a 3GPP LTE/LTE-A system, which is an example of a wireless communication system.

In a cellular OFDM wireless packet communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 3(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since OFDMA is used on a downlink in the 3GPP LTE system, OFDM symbols represent one symbol interval. The OFDM symbols may be referred to as SC-FDMA symbols or symbol interval. The resource block as resource allocation unit may include a plurality of continuous subcarriers in one slot.

The number of OFDM symbols included in one slot may be varied depending on configuration of cyclic prefix (CP). Examples of the CP include extended CP and normal CP. For example, if the OFDM symbols are configured by normal CP, the number of OFDM symbols included in one slot may be 7. If the OFDM symbols are configured by extended CP, since the length of one OFDM symbol is increased, the number of OFDM symbols included in one slot is smaller than that of OFDM symbols in case of normal CP. In case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 3(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One of the five subframes includes two slots. The DwPTS is used for initial cell search, synchronization or channel estimation at the user equipment. The UpPTS is used to synchronize channel estimation at the base station with uplink transmission of the user equipment. Also, the guard period is to remove interference occurring in the uplink due to multipath delay of downlink signals between the uplink and the downlink.

Each half frame includes five subframes, in which the subframe "D" is for downlink transmission, the subframe "U" is for uplink transmission, the subframe "S" is a special subframe that includes a downlink pilot time slot (DwPTS), a guard period (GP), and an uplink pilot time slot (UpPTS). The DwPTS is used for initial cell search, synchronization or channel estimation at the user equipment. UpPTS is used to synchronize uplink transmission of the user equipment and channel estimation at the base station. Also, the guard period is to remove interference occurring in the uplink due to multipath delay of downlink signals between the uplink and the downlink.

In case of 5 ms downlink-uplink switch-point period, the special subframe S exists per half-frame. In case of 5 ms downlink-uplink switch-point period, the special subframe S exists at the first half-frame only. Subframe indexes 0 and 5 (subframe 0 and 5) and DwPTS are for downlink transmission only. The subframe subsequent to the UpPTS and the special subframe is always for uplink transmission. If multi-cells are aggregated, the user equipment may assume the same uplink-downlink configuration for all the cells, and the guard periods of the special frames at different cells are overlapped for at least 1456 Ts. The aforementioned structure of the radio frame is only exemplary, and various modifications may be made in the number of subframes included in the radio frame or the number of slots included in the subframe, or the number of symbols included in the slot.

The following Table 1 illustrates a configuration of the special subframe (length of DwPTS/GP/UpPTS).

TABLE 1

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | Extended cyclic prefix in uplink | DwPTS | UpPTS Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | $4384 \cdot T_S$ | $5120 \cdot T_S$ | $23040 \cdot T_S$ | | |
| 7 | $21952 \cdot T_S$ | | | | | |
| 8 | $24144 \cdot T_S$ | | | | | |

The following Table 2 illustrates uplink-downlink configuration.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, in the 3GPP LTE system, the type 2 frame structure includes seven types of uplink-downlink configurations. The number or position of downlink subframes, special subframes and uplink subframes may be varied per configuration. Hereinafter, various embodiments of the present invention will be described based on the uplink-downlink configuration of the type 2 frame structure illustrated in Table 2.

The aforementioned structure of the radio frame is only exemplary, and various modifications may be made in the number of subframes included in the radio frame, the number of slots included in the subframe, or the number of symbols included in the slot.

Figure 4:
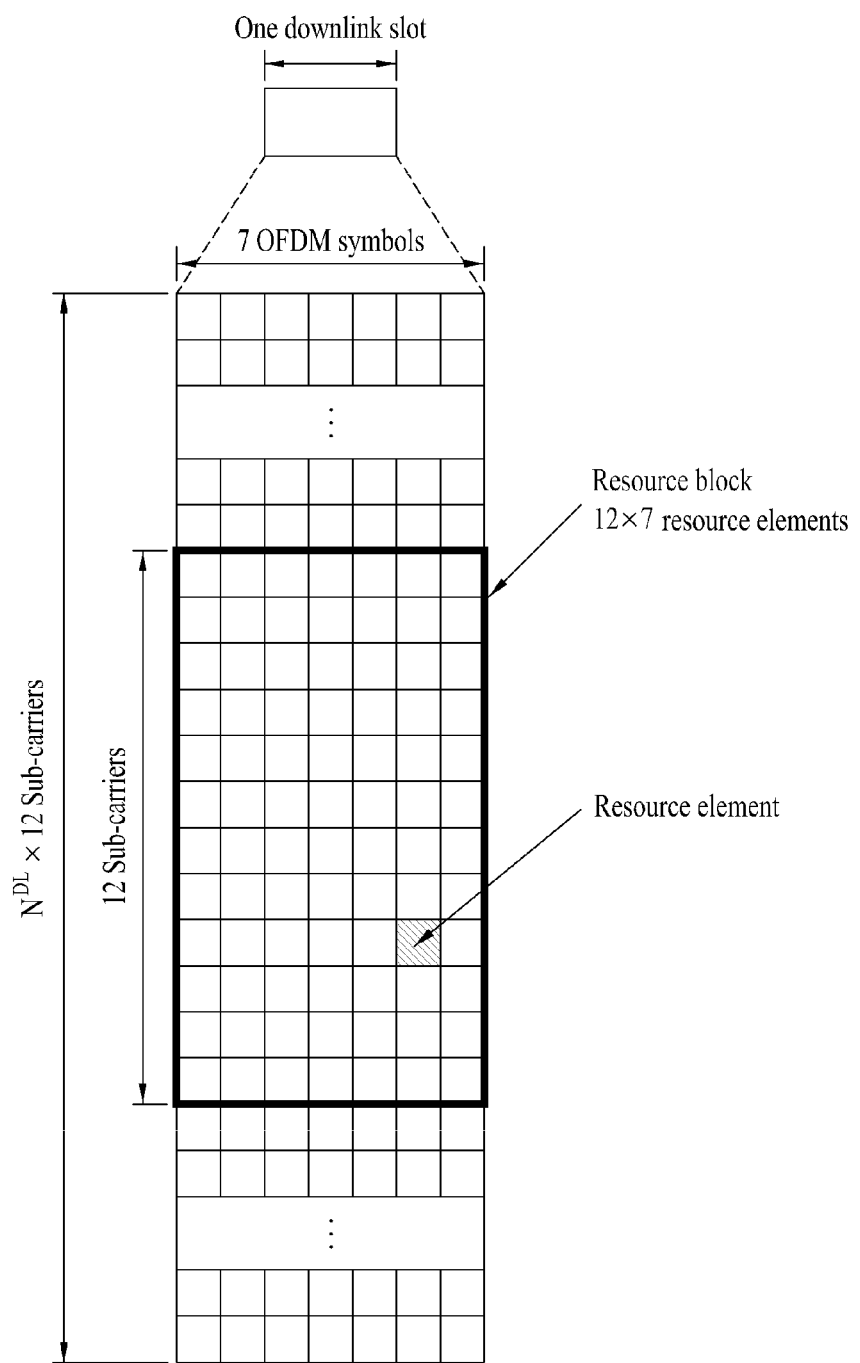
FIG. 4 is a diagram illustrating a resource grid of a downlink slot of a 3GPP LTE/LTE-A system which is an example of a wireless communication system.

FIG. 4 is a diagram illustrating a resource grid of a downlink slot in a 3GPP LTE/LTE-A system, which is an example of a wireless communication system.

Referring to FIG. 4, the downlink slot includes a plurality of OFDM symbols in a time domain. One downlink slot includes seven(six) OFDM symbols, and a resource block includes twelve subcarriers in a frequency domain. Each element on the resource grid will be referred to as a resource element (RE). One resource block (RB) includes 12×7(6) resource elements. The number $N_{RB}$ of resource blocks (RBs) included in the downlink slot depends on a downlink transmission bandwidth. A structure of an uplink slot may be the same as that of the downlink slot, wherein OFDM symbols are replaced with SC-FDMA symbols.

FIG. 5 is a diagram illustrating a structure of a downlink subframe in a 3GPP LTE/LTE-A system, which is an example of a wireless communication system.

Referring to FIG. 5, maximum three (four) OFDM symbols located at the front of the first slot of the subframe correspond to a control region to which control channels are allocated. The other OFDM symbols correspond to a data region to which a physical downlink shared channel (PDSCH) is allocated. Examples of the downlink control channel used in the 3GPP LTE include a PCFICH (Physical Control Format Indicator CHannel), a PDCCH (Physical Downlink Control CHannel), and a PHICH (Physical Hybrid ARQ Indicator CHannel). The PCFICH is transmitted at the first OFDM symbol of the subframe, and carries information on the number (that is, the size of the control region) of OFDM symbols used for transmission of the control channel within the subframe. The PHICH is a response channel to the uplink transmission, and carries ACK/NACK (acknowledgement/negative-acknowledgement) signal for HARQ (hybrid automatic repeat request). The control information transmitted through the PDCCH will be referred to as downlink control information (DCI). The DCI includes format 0 defined for an uplink and formats 1, 1A, 1B, 1C, 1D, 2, 2A, 3, and 3A defined for a downlink. The DCI format selectively includes information such as a hopping flag, RB allocation, modulation coding scheme (MCS), redundancy version (RV), new data indicator (NDI), transmit power control (TPC), cyclic shift demodulation reference signal (DMRS), channel quality information (CQI) request, HARQ process number, transmitted precoding matrix indicator (TPMI), and precoding matrix indicator (PMI) confirmation in accordance with usage.

The PDCCH carries transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, Tx power control information, and activity information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). The format of the PDCCH and the number of bits of the PDCCH are determined depending on the number of CCEs. The base station determines a PDCCH format depending on the DCI to be transmitted to the user equipment, and attaches cyclic redundancy check (CRC) to the control information. The CRC is masked (or scrambled) with an identifier (for example, radio network temporary identifier (RNTI)) depending on usage of the PDCCH or owner of the PDCCH. For example, if the PDCCH is for a specific user equipment, the CRC may be masked with an identifier (for example, cell-RNTI (C-RNTI)) of the corresponding user equipment. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 6:
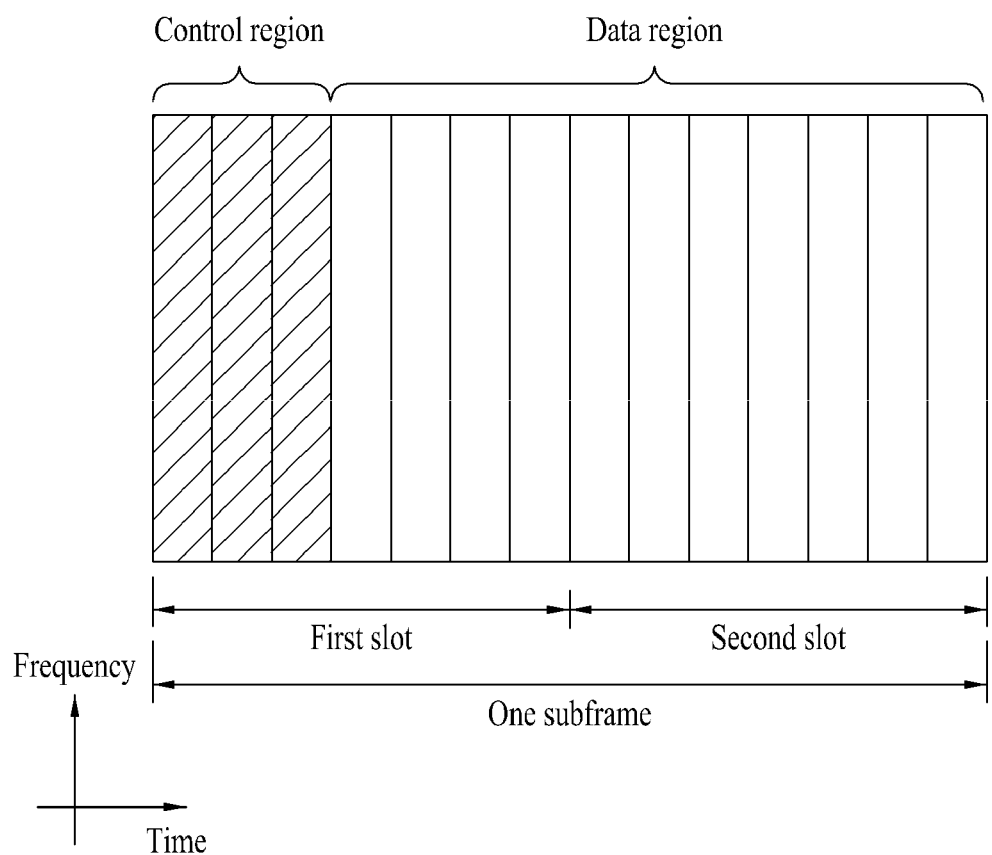
FIG. 6 is a diagram illustrating a structure of an uplink subframe of a 3GPP LTE/LTE-A system which is an example of a wireless communication system.

FIG. 6 is a diagram illustrating a structure of an uplink subframe in an LTE system in a 3GPP LTE/LTE-A system, which is an example of a wireless communication system.

Referring to FIG. 6, the uplink subframe includes a plurality of slots (for example, two). Each slot may include a plurality of SC-FDMA symbols, wherein the number of SC-FDMA symbols included in each slot is varied depending on a cyclic prefix (CP) length. The uplink subframe is divided into a data region and a control region in a frequency domain. The data region includes a PUSCH, and is used to transmit a data signal such as voice. The control region includes a PUCCH, and is used to transmit uplink control information (UCI). The PUCCH includes RB pair located at both ends of the data region on a frequency axis, and performs hopping on the border of the slots.

The PUCCH may be used to transmit the following control information.

SR (Scheduling Request): is information used to request uplink UL-SCH resource. The SR is transmitted using an on-off keying (OOK) system.

HARQ ACK/NACK: is a response signal to a downlink data packet on the PDSCH. It represents whether the downlink data packet has been successfully received. ACK/NACK 1 bit is transmitted in response to a single downlink codeword (CW), and ACK/NACK 2 bits are transmitted in response to two downlink codewords.

CQI (Channel Quality Information): is feedback information on a downlink channel. The MIMO (Multiple Input Multiple Output) related feedback information includes a rank indicator (RI), a precoding matrix indicator (PMI), and a precoding type indicator (PTI). 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH. The PUCCH supports seven formats in accordance with information which is transmitted.

Table 3 illustrates a mapping relation between the PUCCH format and the UCI in the LTE system.

TABLE 3

| PUCCH format | Uplink control information (UCI) |
|---|---|
| Format 1 | SR (Scheduling Request) (non-modulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

FIG. 7 is a diagram illustrating a carrier aggregation (CA) communication system.

The LTE-A system uses the carrier aggregation technology or the bandwidth aggregation technology, which uses greater uplink/downlink bandwidth through a plurality of uplink/downlink frequency blocks, to use wider frequency bandwidth. Each small frequency bandwidth is transmitted using a component carrier (CC). The component carrier may be understood as carrier frequency (or center carrier or center frequency) for a corresponding frequency block.

The respective CCs may adjoin each other or not in the frequency domain. A bandwidth of the CC may be limited to a bandwidth used in the existing system to maintain backward compatibility with the existing system. For example, the existing 3GPP LTE system supports bandwidths of {1.4, 3, 5, 10, 15, 20} MHz, and the 3GPP LTE-A system may support a bandwidth greater than 20 MHz using the above bandwidths supported by the LTE system. A bandwidth of each component carrier may be defined independently. Asymmetric carrier aggregation where the number of UL CCs is different from the number of DL CCs may be performed. DL CC/UL CC links may be fixed to the system or may be configured semi-statically. For example, if the number of DL CCs is 4 and the number of UL CCs is 2 as shown in FIG. 7(a), DL-UL linkage may be configured to correspond to correspond to DL CC: UL CC=2:1. Similarly, if the number of DL CCs is 2 and the number of UL CCs is 4 as shown in FIG. 7(b), DL-UL linkage may be configured to correspond to correspond to DL CC: UL CC=1:2. Unlike the shown case, symmetric carrier aggregation where the number of UL CCs is the same as the number of DL CCs may be performed. In this case, DL-UL linkage of DL CC: UL CC=1:1 may be configured.

Also, even though a system full bandwidth includes N number of CCs, a frequency bandwidth that may be monitored and received by a specific user equipment may be limited to M(<N) number of CCs. Various parameters for carrier aggregation may be configured cell-specifically, UE group-specifically, or UE-specifically. Meanwhile, the control information may be set to be transmitted and received through a specific CC only. This specific CC may be referred to as a primary CC (PCC), and the other CCs may be referred to as secondary CCs (SCC).

The LTE-A system uses a concept of a cell to manage radio resources. The cell is defined by combination of downlink resources and uplink resources, wherein the uplink resources may be defined selectively. Accordingly, the cell may be configured by downlink resources only, or may be configured by downlink resources and uplink resources. If carrier aggregation is supported, linkage between carrier frequency (or DL CC) of the downlink resources and carrier frequency (or UL CC) of the uplink resources may be indicated by system information. The cell operated on the primary frequency (or PCC) may be referred to as a primary cell (PCell), and the cell operated on the secondary frequency (or SCC) may be referred to as a secondary cell (SCell).

The PCell is used such that the user equipment performs an initial connection establishment procedure or connection re-establishment procedure. The PCell may refer to a cell indicated during a handover procedure. The SCell may be configured after RRC connection is established, and may be used to provide an additional radio resource. The PCell and the SCell may be referred to as serving cells. Accordingly, although the user equipment is in RRC-CONNECTED state, if it is not set by carrier aggregation or does not support carrier aggregation, a single serving cell configured by the P cell only exists. On the other hand, if the user equipment is in the RRC-CONNECTED state and is set by carrier aggregation, one or more serving cells may exist, wherein the serving cells may include the PCell and full SCells. After an initial security activation procedure starts, for the user equipment supporting carrier aggregation, the network may configure one or more SCells in addition to the PCell initially configured during a connection establishment procedure.

Unlike the existing LTE system that uses one carrier, a method for effectively controlling a plurality of component carriers in carrier aggregation that uses the plurality of component carriers has been required. In order to efficiently control the component carriers, the component carriers may be classified in accordance with their functions and features. In carrier aggregation, multiple carriers may be divided into a primary component carrier (PCC) and secondary component carrier (SCC). The component carriers may be UE-specific parameters.

The primary component carrier PCC is the component carrier that becomes a core for control of several component carriers when the component carriers are used, and is defined for each user equipment. The primary component carrier PCC may serve as a core carrier that controls the full component carriers, and the other secondary component carriers may serve to provide additional frequency resources for high transmission rate. For example, connection (RRC) for signaling between the base station and the user equipment may be performed through the primary component carrier. Information for security and upper layer may also be provided through the primary component carrier. Actually, if only one component carrier exists, the corresponding component carrier will be the primary component carrier. At this time, the component carrier may perform the same function as that of the carrier of the existing LTE system.

The base station may allocate an activated component carrier (ACC) of the plurality of component carriers to the user equipment. The user equipment previously knows the activated component carrier (ACC) allocated thereto through signaling. The user equipment may collect responses to the plurality of PDCCHs, which are received from the downlink PCell and the downlink SCells, and may transmit the collected responses to the PUCCH through the uplink PCell.

First of all, PUSCH transmission power determination of the user equipment for PUSCH transmission in the 3GPP LTE, LTE-A system will be described hereinafter. The following Equation 1 is to determine the transmission power of the user equipment when a serving cell 'c' in the system, which supports CA, transmits PUSCH only without simultaneously transmitting PUCCH at subframe index i.

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{Bmatrix} [dBm] \quad \text{[Equation 1]}$$

The following Equation 2 is to determine the PUSCH transmission power when the serving cell 'c' in the system, which supports CA, simultaneously transmits PUSCH and PUCCH at subframe index i.

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{Bmatrix} [dBm] \quad \text{[Equation 2]}$$

Hereinafter, parameters, which will be described in respect of the Equation 1 and the Equation 2, determine the uplink transmission power of the user equipment at the serving cell 'c'. In this case, $P_{CMAX,c}(i)$ of the Equation 1 represents a maximum power of the user equipment, which may be transmitted, at the subframe index i, and $\hat{P}_{CMAX,c}(i)$ of the Equation 2 represents a linear value of $P_{CMAX,c}(i)$ $\hat{P}_{PUCCH}(i)$ of the Equation 2 represents a linear value of $P_{PUCCH}(i)$ (in this case, $P_{PUCCH}(i)$ represents PUCCH transmission power at subframe index i).

In the Equation 1 again, $M_{PUSCH,c}(i)$ is a parameter representing a bandwidth of PUSCH resource allocation expressed by the number of useful resource blocks for the subframe index i, and is a value allocated by the base station. $P_{O\_PUSCH,c}(j)$ is a parameter configured by sum of a cell-specific nominal component $P_{O\_NOMINAL\_PUSCH,c}(j)$ provided from a higher layer and a user equipment-specific component $P_{O\_UE\_PUSCH,c}(j)$ provided from the higher layer, and is a value notified to the user equipment by the base station. PUSCH transmission/retransmission corresponding to a grant which is dynamically scheduled is j=1, and PUSCH transmission/retransmission corresponding to a random access response grant is j=2. And, $P_{O\_UE\_PUSCH,c}(2)=0$ and $P_{O\_NOMINAL\_PUSCH,c}(2)=P_{O\_PRE}+\Delta_{PREAMBLE\_Msg3}$ are obtained, and parameters $P_{O\_PRE}$ (preambleInitialReceivedTargetPower) and $\Delta_{PREAMBLE\_Msg3}$ are signaled from the higher layer.

$\alpha_c(j)$ is a pathloss compensation factor, and is a cell-specific parameter provided from the higher layer and transmitted from the base station by 3 bits, wherein $\alpha \in \{0, 0.4, 0.5, 0.6, 0.7, 0.8, 0.9, 1\}$ is obtained when j=0 or 1, and $\alpha_c(j)$ is equal to 1, that is, $\alpha_c(j)=1$ when j=2. $\alpha_c(j)$ is a value notified to the user equipment by the base station.

pathloss ($PL_c$) is a downlink pathloss (or signal loss) estimated value calculated by the user equipment in a unit of dB, and is expressed as $PL_c$=referenceSignalPower-higher layer filteredRSRP, wherein referenceSignalPower may be notified to the user equipment by the base station through the higher layer.

$f_c(i)$ is a value representing a current PUSCH power control adjustment state for the subframe index i, and may be expressed as a current absolute value or an accumulated value. If accumulation is enabled on the basis of a parameter Accumulation-enabled provided from the higher layer or a TPC command $\delta_{PUSCH,c}$ is included in the PDCCH together with a DCI format 0 for the serving cell 'c' in which CRC is scrambled with Temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled for subframe $i-K_{PUSCH}$ through the PDCCH together with the DCI formats 0/4 or 3/3 A, wherein $f_c(0)$ is the first value after reset of the accumulated value.

The value of $K_{PUSCH}$ is defined in the LTE standard, as follows.

For FDD (Frequency Division Duplex), the value of $K_{PUSCH}$ is 4. For TDD UL/DL configurations 0 to 6, the value of $K_{PUSCH}$ is as illustrated in Table 4 below. For TDD UL/DL configuration 0, the Least Significant Bit (LSB) of UL index is set to 1, and if PUSCH transmission is scheduled together with the PDCCH of the DCI formats 0/4 for the subframe 2 or 7, $K_{PUSCH}=7$ is obtained. For other PUSCH transmission, the value of $K_{PUSCH}$ is as illustrated in Table 4 below.

TABLE 4

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The user equipment tries to decode the PDCCH of the DCI formats 0/4 with its C-RNTI or the PDCCH of the DCI formats 3/3A with its TPC-PUSCH-RNTI and the DCI format for SPS C-RNTI every subframe except for a case of discontinued reception (DRX). If the DCI formats 0/4 and the DCI formats 3/3A for the serving cell 'c' are detected for the same subframe, the user equipment should use $\delta_{PUSCH,c}$ provided by the DCI formats 0/4. There is no TPC command decoded for the serving cell 'c', DRX occurs, or $\delta_{PUSCH,c}=0$ dB is otained for a subframe of i not the uplink subframe in TDD.

The accumulated value of $\delta_{PUSCH,c}$ sgnaled on the PDCCH together with the DCI formats 0/4 is as illustrated in Table 5 below. If the PDCCH is validated by SPS activation together with the DCI format 0 or is released, $\delta_{PUSCH,c}=0$ dB. The accumulated value of $\delta_{PUSCH,c}$ signaled on the PDCCH together with the DCI formats 3/3A is one of SET1 of the following Table 5 or one of SET2 of the following Table 6, which is determined by a TPC-index parameter provided from the higher layer.

TABLE 5

| TPC Command Field in DCI format 0/3/4 | Accumulated $\delta_{PUSCH, c}$ [dB] | Absolute $\delta_{PUSCH, c}$ [dB] only DCI format 0/4 |
|---|---|---|
| 0 | −1 | −4 |
| 1 | 0 | −1 |
| 2 | 1 | 1 |
| 3 | 3 | 4 |

TABLE 6

| TPC Command Field in DCI format 3A | Accumulated $\delta_{PUSCH, c}$ [dB] |
|---|---|
| 0 | −1 |
| 1 | 1 |

If the user equipment reaches a transmission maximum power $P_{CMAX,c}$ at the serving cell 'c', a positive TPC command for the serving cell 'c' is not accumulated. On the other hand, if the user equipment reaches a minimum power, a negative TPC command is not accumulated.

For the serving cell 'c', when the value of $P_{O\_UE\_PUSCH,c}(j)$ is changed in the higher layer, and when the user equipment receives a random access response message at the primary cell, the user equipment resets accumulation.

If accumulation is not enabled on the basis of the parameter Accumulation-enabled provided form the higher layer, $f_c(i)=\delta_{PUSCH,c}(i-K_{PUSCH})$ is satisfied. In this case, $\delta_{PUSCH,c}(i-K_{PUSCH})$ is signaled for the subframe $i-K_{PUSCH}$ through the PDCCH together with the DCI formats 0/4.

The value of $K_{PUSCH}$ is as follows. For FDD (Frequency Division Duplex), the value of $K_{PUSCH}$ is 4. For TDD UL/DL configurations 0 to 6, the value of $K_{PUSCH}$ is as illustrated in Table 4 above. For TDD UL/DL configuration 0, the Least Significant Bit (LSB) of UL index is set to 1, and if PUSCH transmission is scheduled together with the PDCCH of the DCI formats 0/4 for the subframe 2 or 7, $K_{PUSCH}=7$ is obtained. For other PUSCH transmission, the value of $K_{PUSCH}$ is as illustrated in Table 4 above.

The accumulated value of $\delta_{PUSCH,c}$ signaled on the PDCCH together with the DCI formats 0/4 is as illustrated in Table 5 above. If the PDCCH is validated by SPS activation together with the DCI format 0 or is released, $\delta_{PUSCH,c}=0$ dB.

There is no PDCCH decoded together with the DCI format for the serving cell 'c', DRX occurs, or $f_c(i)=f_c(i-1)$ is obtained for a subframe of i not the uplink subframe in TDD.

For two types of $f_c(*)$ (accumulated or current absolute value), the first value is set as follows.

For the serving cell 'c', when the value of $P_{O\_UE\_PUSCH,c}(j)$ is changed in the higher layer, or if the value of $P_{O\_UE\_PUSCH,c}(j)$ is received by the higher layer and the serving cell 'c' is a secondary cell, $f_c(0)=0$ is obtained. Unlike this, if the serving cell is the primary cell, $f_c(0)=\Delta P_{rampup}+\delta_{msg2}$ is obtained. $\delta_{msg2}$ is a TPC command indicated by the random access response, and $\Delta P_{rampup}$ corresponds to a total power ramp-up from the first preamble to the last preamble, and is provided from the higher layer.

Also, in respect of the present invention, when the TPC command for uplink power control (ULPC) is operated in an accumulated mode, the accumulated value is operated, as follows, in its related art. For the serving cell 'c', when the value of $P_{O\_UE\_PUSCH,c}(j)$ is changed in the higher layer, and when the user equipment receives the random access response message from the primary cell, the user equipment should reset accumulation in the following cases.

The CA introduced by the LTE-A system may be configured within an intra band only or by combination of component carriers of inter bands. According to the related art, one uplink (UL) timing advance (TA) is set regardless of CA configuration. However, it may be difficult to set one uplink timing advance due to difference in frequency features between the inter bands. In this respect, multiple TA groups may be supported.

Also, in the TDD system during CA configuration according to the related art, the base station has transmitted the PUCCH at the PCell only by using the same DL/UL configuration. However, if each TDD DL/UL configuration different from another TDD DL/UL configuration is used for each cell during CA configuration, a case may occur, in which the PCell is a downlink subframe interval and the other cell is an uplink subframe interval. In this case, if the PUCCH can be transmitted from the PCell only, a problem occurs in that the PUCCH cannot be transmitted.

Accordingly, in the system that supports CA, respective TDD DL/UL configurations may be configured differently from each other considering traffic load for each cell. In this case, a downlink subframe and an uplink subframe may exist for a specific subframe interval differently for each cell as will be aware of it from FIG. 8 below.

Method for Transmitting PUCCH Under CA Status Having Different TDD DL/UL Configurations FIG. 8 is a diagram illustrating an example of TDD DL/UL configurations different from one another for each cell.

As shown in FIG. 8, the base station may set cells 0 to 6 to serving cells and notify the user equipment of the set serving cells. At this time, TDD DL/UL configurations different from one another may be set for each cell, and the base station may notify the user equipment of TDD DL/UL configuration set for each cell through higher layer signaling.

In FIG. 8, TDD DL/UL configuration 0 is configured for cell 0, TDD DL/UL configuration 1 is configured for cell 1, TDD DL/UL configuration 2 is configured for cell 2, TDD DL/UL configuration 3 is configured for cell 3, TDD DL/UL configuration 4 is configured for cell 4, TDD DL/UL configuration 5 is configured for cell 5, and TDD DL/UL configuration 6 is configured for cell 6. Although each of TDD DL/UL configurations different from one another is configured for each cell in FIG. 8, it is to be understood that the present invention is not limited to the example of FIG. 8.

Since uplink control information (UCI) (for example, PUCCH, hereinafter, PUCCH will be described exemplarily) is transmitted from the PCell only, if the PCell corresponds to a downlink subframe interval, uplink control information on the other SCells may not be transmitted. Accordingly, in order to solve this problem, it is suggested that PUCCH is transmitted even from the SCell of the uplink subframe interval.

If the PCell corresponds to the uplink subframe interval, the user equipment allows the PCell to transmit the PUCCH. If the PCell corresponds to the downlink subframe interval and the other SCells correspond to the uplink subframe interval, the user equipment allows one SCell to transmit the PUCCH. For example, in FIG. 8, on the assumption that cell 0 is SCell and cell 1 is PCell, an area marked with B will be described. Subframe 4 is the uplink subframe at the SCell (cell 0), and is the downlink subframe at the PCell (cell 1). In this case, for the subframe 4, the user equipment cannot transmit the PUCCH at the PCell (cell 1) which is the downlink subframe but may transmit the PUCCH at the SCell (cell 0).

In the meantime, in order to prevent power fluctuation for each cell from occurring while PUCCH transmission for each subframe is being changed to the Pcell and the Scell, the user equipment may be configured to transmit the PUCCH at a specific Scell only in specific DL/UL configuration.

Alternatively, the base station may notify the user equipment whether to select which one of two options, through signaling. A cell having the lowest Cell index of cells corresponding to the uplink subframe interval or a previously determined cell (for example, cell having the greatest number of uplink subframes) may be used as one SCell. Alternatively, a cell having the lowest cell index of SCells which belong to the same timing advance (TA) group or a previously determined cell may be used as one SCell. The base station may previously determine one SCell and then notify the user equipment of the determined cell.

On the other hand, the user equipment may be configured to allow all the Scells to transmit the PUCCH.

The following Equation 3 is the equation related to uplink power control for the PUCCH in the LTE-A system.

$$P_{PUSCH}(i) = \min \begin{Bmatrix} P_{CMAX,c}(i), \\ P_{0\_PUCCH} + PL_c + h(n_{CQI}, n_{HARQ}, n_{SR}) \\ \Delta_{F\_PUCCH}(F) + \Delta_{T \times D}(F') + g(i) \end{Bmatrix} \quad \text{[Equation 3]}$$

In the above Equation 3, i is subframe index, and c is cell index. If the user equipment is configured by the higher layer to transmit PUCCH on two antenna ports, a value of $\Delta_{TxD}(F')$ is provided by the higher layer to the user equipment, and is 0 in other cases. A parameter, which will be described hereinafter, relates to a serving cell of which cell index is c.

In this case, i is subframe index, $P_{CMAX}$ represents a maximum power of the user equipment, which may be transmitted, $P_{O\_PUCCH}$ is a parameter configured by sum of cell-specific parameters and is notified by the base station through higher layer signal, and PL is a downlink pathloss (or signal loss) estimated value calculated by the user equipment in a unit of dB and is expressed by PL=referenceSignalPower–higher layer filteredRSRP. h(n) is varied depending on a PUCCH format, $n_{CQI}$ is the number of information bits for channel quality information (CQI), and $n_{HARQ}$ represents the number of HARQ bits. A value of $\Delta_{F\_PUCCH}(F)$ is a relative value to a PUCCH format 1a, corresponds to a PUCCH format (F), and is notified by the base station through higher layer signaling. g(i) represents a current PUCCH power control adjustment state of subframe of index i.

$h(n_{CQI}, n_{HARQ}, n_{SR})$ is 0 at PUCCH formats 1, 1a and 1b, and if one or more serving cells are configured for the user equipment at the PUCCH format 1b, $$h(n_{CQI}, n_{HARQ}, n_{SR}) = \frac{(n_{HARQ} - 1)}{2}.$$

And, for PUCCH formats 2, 2a and 2b, $h(n_{CQI}, n_{HARQ}, n_{SR})$ may be expressed by the following Equation 4 in case of normal cyclic prefix (CP) and may be expressed by the following Equation 5 in case of extended CP.

$$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases} \quad \text{[Equation 4]}$$

$$h(n_{CQI}, n_{HARQ}, n_{SR}) = \quad \text{[Equation 5]}$$
$$\begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

For PUCCH format 3, if the user equipment transmits HARQ-ACK/SR of 11 bits or more, the following Equation 6 may be expressed. If not so, the following Equation 7 may be expressed.

$$h(n_{CQI}, n_{HARQ}, n_{SR}) = \frac{n_{HARQ} + n_{SR} - 1}{3} \quad \text{[Equation 6]}$$

$$h(n_{CQI}, n_{HARQ}, n_{SR}) = \frac{n_{HARQ} + n_{SR} - 1}{2} \quad \text{[Equation 7]}$$

When a value of $P_{O\_UE\_PUCCH}$ is changed at the higher layer, $g(0)=0$, and if not so, $g(0)=\Delta P_{rampup}+\delta_{msg2}\cdot\delta_{msg2}$ is a TPC command indicated by a random access response, and $\Delta P_{rampup}$ corresponds to total power ramp-up from the first to last preambles provided by the higher layer.

If the user equipment reaches a transmission maximum power $P_{CMAX,c}$ at the primary cell 'c', a positive TPC command for the primary cell 'c' is not accumulated. On the other hand, if the user equipment reaches a minimum power, a negative TPC command is not accumulated. The user equipment resets accumulation when the value of $P_{O\_UE\_PUCCH}$ is changed by the higher layer or a random access response message msg2 is received.

In the meantime, the following Tables 7 and 8 illustrate a value of $\delta_{PUCCH}$ at a TPC command field of the DCI format.

TABLE 7

| TPC Command Field in DCI format 1A/1B/1D/1/2A/2B/2C/2/3 | $\delta_{PUCCH}$ [dB] |
|---|---|
| 0 | −1 |
| 1 | 0 |
| 2 | 1 |
| 3 | 3 |

TABLE 8

| TPC Command Field in DCI format 3A | $\delta_{PUCCH}$ [dB] |
|---|---|
| 0 | −1 |
| 1 | 1 |

The uplink power control equation for PUCCH transmission and its related uplink power control parameter have been described with reference to the above Equation 3. If each of TDD UL/DL configurations different from one another is configured for each cell as described above, a case where the SCell transmits the PUCCH may occur.

In this way, since the SCell may transmit the PUCCH, it is required that each PUCCH parameter should be defined for each cell to configure the transmission power in the Equation 3. Accordingly, the Equation 3 may be expressed by the following Equation 8.

$$P_{PUCCH,c}(i) = \min\begin{Bmatrix} P_{CMAX,c}(i), \\ P_{0\_PUCCH,c} + PL_c + h_c(n_{CQI}, n_{HARQ}, n_{SR}) + \\ \Delta_{F\_PUCCH,c}(F) + \Delta_{T\times D,c}(F') + g_c(i) \end{Bmatrix} \quad \text{[Equation 8]}$$

In addition to cell index c added to each uplink power control parameter, the description of each uplink power control parameter in the Equation 3 may be applied to the Equation 8. The base station may notify the user equipment of the values of the uplink power control parameters signaled to the higher layer for each cell.

Otherwise, all the uplink power control parameters of the PCell may be reused as they are unlike the Equation 8. At this time, the base station may additionally notify the user equipment of the value obtained considering power difference for each cell. Otherwise, in determining the PUCCH transmission power value of the user equipment, an accumulated TPC command may only be reused and the value of the corresponding SCell may be used as the other uplink control parameters. Otherwise, the condition for reuse may be limited to a case where pathloss (PL) is used for the PCell.

Method for PHR Report of PUCCH Under CA Status Having Different TDD DL/UL Configurations The user equipment may report PHR information on the PUCCH at the PCell only during power headroom reporting (PHR). Also, the user equipment may configure and report PHR information on the PUCCH even at a specific SCell during PHR transmission for PUCCH transmission at the SCell. Alternatively, the user equipment may report PHR information on the PUCCH to all the SCells. For example, the PHR information for the PUCCH may be configured as expressed by the following Equation.

$$PHR_{PUCCH}=P_{O\_PUCCHc}+PL_c+gc(i)$$
$$\text{또는 } PHR_{PUCCH}=P_{O\_PUCCHc}+PLc$$

At this time, three parameter values, that is, $\Delta_{TxD,c}(F')$, $h_c(n_{CQI}, n_{HARQ}, n_{SR})$ and $\Delta_{F\_PUCCH,c}(F)$, which are determined by the PUCCH format of the parameters defined in the Equation 3 or 8, are set to 0 dB. Values of MPR, A-MPR, and P-MPR are also set to 0 dB. An initial value of g(i) of the SCell is set to 0 dB. Alternatively, if different timing advances (TAs) are applied, the initial value may be set to sum of TPC commands received from PRACH total ramp up size and Ranging response.

In the TDD system, accumulated commands g(i) or $g_c(i)$ allow the values of the TPC command field of the PDCCH of several downlink subframes to be accumulated for the uplink subframe.

The following Table 9 illustrates Table 10.1.3.1-1 Downlink association set index K of 3GPP TS 36.213.

TABLE 9

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |

TABLE 9-continued

| UL-DL Configuration | 0 | 1 | 2 | 3 | 4 | 5 | 6 | 7 | 8 | 9 |
|---|---|---|---|---|---|---|---|---|---|---|
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

As will be aware of it from Table 9, downlink PDCCHs related to transmission of the PDCCH at the SCell may operate a real TPC command, and a TPC field of the PDCCH for the other uplink subframes which are not related to PUCCH transmission may be used for another purpose of use.

Alternatively, the PDCCH of the corresponding cell is configured by the real TPC command. For a specific SCell, PUCCH resource allocation is separately signaled by the base station to the user equipment. For example, if PUCCH resource allocation is notified implicitly, the same concept at the PCell is applied to the SCell as it is.

On the other hand, if PUCCH resource allocation is notified explicitly using the TPC field of the PDCCH, the real TPC command is applied to the SCell that transmits the PUCCH, and A/N resource indicator (ARI) is used at the other SCell. If ACK/NACK channel is selected, the corresponding SCell may be considered as the PCell.

In accordance with various embodiments of the present invention described as above, if different TDD DL/UL configurations are used under the CA status, the transmission power of the user equipment may be configured properly when the PUCCH is transmitted from the SCell.

In the description related to the embodiments according to the present invention, it will be apparent that contents corresponding to a case where one TA group is configured may be applied to even a case where a plurality of TA groups are configured.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for transmitting an uplink control channel from a user equipment in a wireless communication system that supports a plurality of serving cells for the user equipment and the apparatus for the same may industrially be applied to various mobile communication systems such as 3GPP LTE, LTE-A system.

The invention claimed is:

1. A method for transmitting an uplink control channel by a user equipment in a wireless communication system that supports a plurality of serving cells for the user equipment, the method comprising:
   receiving time division duplex (TDD) downlink/uplink configuration information for each of the plurality of serving cells, the plurality of serving cells including a primary cell (Pcell) and at least one secondary cell (Scell); and
   when a physical uplink control channel (PUCCH) transmission is scheduled in a downlink subframe of the Pcell, transmitting a PUCCH through an uplink subframe of a predefined Scell based on a PUCCH transmission power, the predefined Scell corresponding to a Scell having a greatest number of uplink subframes in a TDD frame,
   wherein a subframe number of the downlink subframe in the Pcell is the same as that of the uplink subframe of the predefined Scell, and
   wherein the PUCCH transmission power is determined based on:
      an accumulated transmit power control (TPC) command parameter of the Pcell and other uplink power parameters of the predefined Scell; or
      a pathloss (PL) parameter of the Pcell and other uplink power parameters of the predefined S cell.

2. The method according to claim 1, further comprising:
   receiving information on at least one uplink power control parameter corresponding to the predefined Scell; and
   determining an uplink transmission power for transmitting the uplink control channel through the predefined Scell by using the received at least one uplink power control parameter.

3. The method according to claim 1, wherein the predefined Scell and the Pcell belong to the same timing advance (TA) group.

4. The method according to claim 1, wherein the predefined Scell belongs to a timing advance (TA) group different from that of the Pcell.

5. The method according to claim 2, wherein the information on the at least one uplink power control parameter includes a cell index.

6. The method according to claim 2, wherein the information on the at least one uplink power control parameter is received through a higher layer signaling.

7. A user equipment for transmitting an uplink control channel in a wireless communication system that supports a plurality of serving cells for the user equipment, the user equipment comprising:
   a receiver;
   a transmitter; and
   a processor configured to:
      control the receiver to receive time division duplex (TDD) downlink/uplink configuration information for each of the plurality of serving cells, the plurality of serving cells including a primary cell (Pcell) and at least one secondary cell (Scell), and
      when a transmission of a physical uplink control channel (PUCCH) is scheduled in a downlink subframe of the Pcell, control the transmitter to transmit a PUCCH through an uplink subframe of a predefined Scell based on a PUCCH transmission power, the predefined Scell corresponding to a Scell having a greatest number of uplink subframes in a TDD frame,
      wherein a subframe number of the downlink subframe in the Pcell is same as that of the uplink subframe of the predefined Scell, and
      wherein the PUCCH transmission power is determined based on:
         an accumulated transmit power control (TPC) command parameter of the Pcell and other uplink power parameters of the predefined Scell; or
         a pathloss (PL) parameter of the Pcell and other uplink power parameters of the predefined Scell.

8. The user equipment according to claim 7, wherein the processor is configured to
   control the receiver to further receive information on at least one uplink power control parameter corresponding to the predefined Scell, and determine an uplink transmission power for transmitting the uplink control channel through the predefined Scell by using the received at least one uplink power control parameter.

9. The user equipment according to claim 7, wherein the predefined Scell and the Pcell belong to the same timing advance (TA) group.

* * * * *